United States Patent
He et al.

(10) Patent No.: US 10,486,970 B2
(45) Date of Patent: Nov. 26, 2019

(54) METHOD FOR PREPARATION OF GRAFT MODIFIED AMMONIUM POLYPHOSPHATE WITH ULTRA-LOW HYDROPLANING AND RESISTANCE TO HYDROLYSIS AND APPLICATION THEREOF

(71) Applicant: Zhongshan Complord New Materials Co., LTD, Zhongshan (CN)

(72) Inventors: Yanling He, Guangdong Province (CN); Xiuqin Zhang, Guangdong Province (CN)

(73) Assignee: Zhongshan Complord New Materials Co., LTD, Zhongshan (CN)

( * ) Notice: Subject to any disclaimer, the term of this patent is extended or adjusted under 35 U.S.C. 154(b) by 75 days.

(21) Appl. No.: 15/737,618

(22) PCT Filed: Aug. 20, 2016

(86) PCT No.: PCT/CN2016/096119
§ 371 (c)(1),
(2) Date: Dec. 19, 2017

(87) PCT Pub. No.: WO2017/121118
PCT Pub. Date: Jul. 20, 2017

(65) Prior Publication Data
US 2018/0354796 A1    Dec. 13, 2018

(30) Foreign Application Priority Data
Jan. 14, 2016  (CN) .......................... 2016 1 0029669

(51) Int. Cl.
| C01B 25/40 | (2006.01) |
| C01B 25/28 | (2006.01) |
| C08K 3/32  | (2006.01) |
| C08K 9/06  | (2006.01) |
| C08L 23/12 | (2006.01) |

(52) U.S. Cl.
CPC ............ *C01B 25/405* (2013.01); *C01B 25/28* (2013.01); *C08K 3/32* (2013.01); *C08K 9/06* (2013.01); *C08L 23/12* (2013.01); *C08K 2003/323* (2013.01)

(58) Field of Classification Search
CPC ....... C01B 25/28; C01B 25/405; C08L 23/12; C08K 3/32; C08K 9/06; C08K 2003/323
See application file for complete search history.

(56) References Cited

U.S. PATENT DOCUMENTS

| 3,723,074 A * | 3/1973 | Sears ..................... C01B 25/28 |
| | | 106/18.14 |
| 5,213,783 A * | 5/1993 | Fukumura ............ C01B 25/405 |
| | | 423/305 |
| 5,643,980 A * | 7/1997 | Shindoh .................. C08K 3/32 |
| | | 524/100 |
| 5,700,575 A * | 12/1997 | Iwata ....................... C08K 3/22 |
| | | 428/403 |
| 8,496,901 B2 | 7/2013 | Xie et al. |

FOREIGN PATENT DOCUMENTS

| CN | 101235221   |   | 8/2008  |
| CN | 101597044   |   | 12/2009 |
| CN | 101987728 A | * | 3/2011  |
| CN | 102167304   |   | 8/2011  |
| CN | 102259843 A | * | 11/2011 |
| CN | 103086342 A | * | 5/2013  |
| CN | 104098789   |   | 10/2014 |
| CN | 104401952 A | * | 3/2015  |
| CN | 105482160   |   | 4/2016  |
| JP | 5146644     |   | 2/2013  |

OTHER PUBLICATIONS

Machine translation of CN 1012355221 A, retrieved Apr. 2018 (Year: 2018).*
Presafer "P-N Intumescent Flame Retardant PreiniphorTM EPFR-100C for Polypropylene", Sep. 2014 (Year: 2014).*
Derwent Abstract of CN 102259843 A, 2013 (Year: 2013).*
Derwent Abstract of CN 103086342 A, 2015 (Year: 2015).*
Derwent Abstract of CN 104401952 A, 2017 (Year: 2017).*
Machine translation of CN 104098789 A, retrieved Apr. 2019 (Year: 2019).*
Machine translation of CN 104401952 A, retrieved Apr. 2019 (Year: 2019).*

* cited by examiner

*Primary Examiner* — Nicole M. Buie-Hatcher
(74) *Attorney, Agent, or Firm* — Davidson, Davidson & Kappel, LLC

(57) ABSTRACT

A method for preparation of graft modified ammonium polyphosphate with ultra-low hydroplaning and resistance to hydrolysis belongs to the field of the preparation of flame retardant. Ammonia water is used as hydrolytic agent of amino silane. In the early stage of synthesis of ammonium polyphosphate with phosphorus pentoxide, diammonium hydrogen phosphate and melamine as raw materials, hydrolyzed amino silane ammonia mixture is added, and continues warming reaction, when the temperature drops to a certain temperature, melamine is added to maintain high temperature reaction for a certain period of time, then cools to obtain graft modified ammonium polyphosphate with ultra-low hydroplaning and resistance to hydrolysis. The present disclosure grafts ammonium polyphosphate with two kinds of amino grafting in stages, and the modified ammonium polyphosphate products after grafted basically have no hydroplaning when meets water. Because of addition of excessive melamine in late stage, the excessive melamine is not only used for graft modified ammonium polyphosphate, but also used for reacting with acidic ammonium polyphosphate whose polymerization is incomplete, making it form polyphosphate melamine, eliminate the formation of water-soluble small molecules, and reduce water solubility of the products to a greater extent.

6 Claims, No Drawings

METHOD FOR PREPARATION OF GRAFT MODIFIED AMMONIUM POLYPHOSPHATE WITH ULTRA-LOW HYDROPLANING AND RESISTANCE TO HYDROLYSIS AND APPLICATION THEREOF

This application is a U.S. national phase application under 35 U.S.C. of § 371 of International Application No. PCT/CN2016/096119, filed Aug. 20, 2016, which claims priority of Chinese Patent Application No. 201610029669.2, filed Jan. 14, 2016, the disclosure of which is hereby incorporated by reference herein.

TECHNICAL FIELD

The present disclosure relates to the field of flame retardant preparation, particularly modification of ammonium polyphosphate, and specifically relates to a method for preparation of graft modified ammonium polyphosphate with ultra-low hydroplaning and resistance to hydrolysis and application thereof.

BACKGROUND

Ammonium polyphosphate is a typical halogen-free phosphor-and-nitrogen type flame retardant, which has the advantages of low toxicity, environmentally friendly, high efficiency and low cost, thus it has been widely used in the flame retardant. However, with ammonium polyphosphate is accepted and widely used, its own problems have become increasingly prominent, such as, hydroplaning, poor water resistance, the ordinary compatibility of the resin, which causes the physical properties of the resin severely deteriorated after the modification of traditional ammonium polyphosphate. If it is applied in larger products, the products will produce gas marks. If it is used in the electrical components which contacts with water vapor for a long period of time, there will be a problem of precipitation and the like. To a certain extent, it can't replace the bromine-antimony flame retardant completely, which limits the application of ammonium polyphosphate flame retardant.

In recent years, many scholars have focused that the ammonium polyphosphate is not resistant to hydrolysis and have done a lot of work. At present, the research on coating treatment of ammonium polyphosphate is mainly classified into seven categories: the first one is microencapsulation treatment of ammonium polyphosphate with melamine formaldehyde resin as disclosed in CN103980541A, CN103483873A and etc.; the second one is microencapsulation treatment of ammonium polyphosphate with epoxy resin as disclosed in CN101362836 and etc.; the third one is surface treatment of ammonium polyphosphate with silicone oil as disclosed in CN104479172A and etc.; the fourth one is grafting treatment of ammonium polyphosphate with organic amine as disclosed in CN103382267A, CN103694742A and etc.; the fifth one is firstly microencapsulation treatment with melamine formaldehyde resin, then double coated treatment with acrylate as disclosed in CN103554999A, CN103588992A and etc.; the sixth one is microencapsulation treatment of ammonium polyphosphate with urea resin as disclosed in CN104513407A and etc.; the seventh one is introducing the silane structure during the synthesis of ammonium polyphosphate as disclosed in CN104098789A and etc. . . . .

The first one to the sixth one above are coating or grafting treatment of ammonium polyphosphate itself, wherein the coating of microencapsulation described in the first, the second, the fifth and the sixth one is helpful to reduce viscosity and water solubility, but at the same time, the initial decomposition temperature of the modified ammonium polyphosphate products is reduced. There are risks of early decomposition, color change, and not able to be resistant to high temperature processing in the process of high temperature application for long time. The surface wall capsule can be damaged under certain processing or treatment conditions, causing the body of ammonium polyphosphate is partially exposed. There is still a problem of poor water resistance; meanwhile in the process of high temperature processing, ammonium polyphosphate coated with melamine formaldehyde resin may have the risk of releasing formaldehyde, which has bad effect on the property of materials and environment. The third one is coating with silicone oil, which can improve the viscosity, water solubility and dispersibility of ammonium polyphosphate surface, but the coating can be incomplete, meanwhile during thermal processing and shearing process, the silicone oil coating will be damaged, causing poor water resistance later. The fourth one is grafting with organic amine. The reaction activity of high polymerized ammonium polyphosphate has been weak, and it has difficulty in grafting with organic amine. The grafting will be incomplete, and the final modified ammonium polyphosphate can't achieve the expected high temperature and humidity resistance effect. The seven one is introducing silane group during the synthesis of ammonium polyphosphate. The process is more complicated and takes longer time, meanwhile it can't ensure there is no acid polyphosphate and small molecule in later products, and can also affect the water solubility, the high temperature and humidity resistance effect.

SUMMARY

The object of the present invention is to solve the above problems existing in the prior arts, and provide a method for preparation of graft modified ammonium polyphosphate with ultra-low hydroplaning and resistance to hydrolysis and application thereof. The present disclosure uses ammonia water as hydrolytic agent of amino silane. In the early stage of synthesis of ammonium polyphosphate with phosphorus pentoxide, diammonium hydrogen phosphate and melamine as raw materials, hydrolyzed amino silane ammonia mixture is added, and continues warming reaction, when the temperature drops to a certain temperature, melamine is added to maintain high temperature reaction for a certain period of time, then cools to obtain graft modified ammonium polyphosphate with ultra-low hydroplaning and resistance to hydrolysis.

The present disclosure solves the following problems existing in the prior arts: the prior arts generally use coating treatment of ammonium polyphosphate, there are some following problems. The coating is incomplete and heat processing and shearing treatment can easily break the capsule, which causes the coated material to be exposed. Or silane group is introduced during the synthesis. The process is more complicated and takes longer time, and there are still a small amounts of acid polyphosphate and short chain ammonium polyphosphate small molecule in later products. There is still water soluble. Thus it can't improve the high temperature and humidity resistance effect of the products in the modified plastic. For the above disadvantages, the present disclosure obtains a modified ammonium polyphosphate product truly resistant to high temperature and humidity.

To achieve the above technical objectives and the above technical effects, the technical solutions of the present disclosure are as below:

A method for preparation of graft modified ammonium polyphosphate with low hydroplaning and resistance to hydrolysis, firstly hydrolyzing amino silane under the condition of ammonia water, adding hydrolyzed mixture into a reaction equipment which has been put into phosphorus pentoxide, diammonium hydrogen phosphate and melamine for the reaction, comprising the steps of:

(1) putting amino silane into the reaction equipment, protecting with nitrogen, and stirring, dropping ammonia water solution at room temperature, after finishing the dropping, controlling reaction temperature of the reaction equipment between 25° C. and 100° C. and reacting for 1~10 h;

(2) adding phosphorus pentoxide, diammonium hydrogen phosphate and melamine into the reaction equipment, adjusting revolving speed of the reaction equipment, protecting with nitrogen, heating to 60~150° C., then speeding up the revolving speed, and increasing nitrogen flow, spraying preparation liquid obtained in (1) at upper portion of the reaction equipment evenly and slowly, after finishing spraying, maintaining the reaction temperature of the reaction equipment between 60° C. and 150° C., after 0.1~6 h, starting switching to introduce ammonia gas, raising the reaction temperature of the reaction equipment to 250~320° C., if the temperature is higher than 320° C., switching to introduce nitrogen gas, when the temperature is lower than 300° C., again switching to introduce ammonia gas, ammonia gas flow at this time is less than the ammonia gas flow at the beginning;

(3) when the temperature of the reaction equipment is lower than 280° C., adding melamine through inlet, and setting oil temperature of the reaction equipment between 220° C. and 280° C., maintaining the temperature for 1~6 h, lowering the temperature, discharging and obtaining graft modified ammonium polyphosphate;

wherein, concentration of the ammonia water solution in (1) is 25%, the ratio of mole of water in the ammonia water solution and alkoxy in amino silane is 1~1.5:1, the ratio of quality of amino silane and phosphorus pentoxide in (2) is 0.01~0.15;

the ratio of mole of phosphorus pentoxide and diammonium phosphate in (6) is 1~1.5:1, the ratio of quality of melamine and phosphorus pentoxide is 0.001~0.025;

the ratio of quality of melamine in (7) and phosphorus pentoxide in (2) is 0.01~0.1.

In a better embodiment of the present disclosure, further comprising, comprising the steps of:

(1) putting amino silane into the reaction equipment, protecting with nitrogen, and stirring, dropping ammonia water solution at room temperature, after finishing the dropping, controlling reaction temperature of the reaction equipment between 40° C. and 80° C., and reacting for 1~6 h;

(2) adding phosphorus pentoxide, diammonium hydrogen phosphate and melamine into the reaction equipment, adjusting the revolving speed of the reaction equipment between 10° C. and 40 r/min, protecting with nitrogen, the nitrogen flow is 0.1~6 m$^3$/h, heating to 70~120° C., then speeding up the revolving speed to 40~60 r/min, and increasing the nitrogen flow to 0.3~15 m$^3$/h, spraying preparation liquid obtained in (1) at upper portion of the reaction equipment evenly and slowly, after finishing the spraying, maintaining the reaction temperature of the reaction equipment between 70° C. and 120° C., after 0.5~3 h, starting switching to introduce ammonia gas, the ammonia gas flow is 1~15 m$^3$/h, raising the reaction temperature of the reaction equipment up to 250~320° C., if the temperature is higher than 320° C., switching to introduce nitrogen gas, when the temperature is lower than 300° C., again switching to introduce ammonia gas, the ammonia gas flow is 0.1~6 m$^3$/h, the ammonia gas flow at this time is less than the ammonia flow at the beginning;

(3) when the temperature of the reaction equipment is lower than 280° C., adding melamine through the inlet, and setting the oil temperature of the reaction equipment between 240° C. and 270° C., maintaining the temperature for 2~5 h, lowering the temperature to 25~180° C., discharging and obtaining modified ammonium polyphosphate;

wherein, the ratio of mole of water in the ammonia water solution in (1) and alkoxy in amino silane is 1~1.1:1, the ratio of quality of amino silane and phosphorus pentoxide in (2) is 0.02~0.1;

the ratio of mole of phosphorus pentoxide and diammonium phosphate in (8) is 1~1.08:1, the ratio of quality of melamine and phosphorus pentoxide is 0.003~0.015;

the ratio of quality of melamine in (9) and phosphorus pentoxide in (2) is 0.03~0.06.

In a better embodiment of the present disclosure, further comprising, amino silane includes one or more of the followings: γ-aminopropyltriethoxysilane, γ-aminopropyltrimethoxysilane, N-β (aminoethyl)-γ-aminopropyltrimethoxysilane, N-β (aminoethyl)-γ-aminopropyl-methyl-dimethoxysilane, N-β (aminoethyl)-γ-aminopropyltriethoxysilane, N-β (aminoethyl)-γ-aminopropyl-methyl-diethoxysilane, Anilinomethyltriethoxysilane, Anilinomethyl trimethoxysilane, γ-aminoethyl-aminopropyl-trimethoxysilane, and polyamino-alkyl trialkyl silane.

In a better embodiment of the present disclosure, further comprises, the application of graft modified ammonium polyphosphate, applying graft modified ammonium polyphosphate to modified PP flame retardant material, formula comprising: 240 g of graft modified ammonium polyphosphate, 687 g of homopolymer PP, 3 g of internal lubricant EBS, 3 g of external lubricant PE wax, 2 g of antioxygen B215, 3 g of coupling agent NT201, 2~3 g of antidrip agent TF1645, and 60 g of char-forming agent with water insoluble and high temperature resistance.

In a better embodiment of the present disclosure, further comprises, mixing the components in the formula according to the amount of the formula, putting the mixture into a twin-screw extruder, and then setting temperature of main engine at: 160° C., 180° C., 190° C., 190° C., 200° C., 200° C., 190° C., 180° C. The revolving speed of the main engine is 240~360 rpm.

In a better embodiment of the present disclosure, further comprises that melt index of the homopolymer PP is 12.

The beneficial effect of the present disclosure is:

Firstly, the present disclosure grafts ammonium polyphosphate with two kinds of amino grafting in stages, which makes grafting more thorough, and greatly improves the hydroplaning of ammonium polyphosphate itself. The modified ammonium polyphosphate products after grafted basically have no hydroplaning when meet water.

Secondly, the preparation method of the present disclosure relates to introducing the structure of amino silane, and using the amino group in amino silane to participate in ammonium polyphosphate synthesis reaction to produce ammonium polyphosphate products containing silane, which may improve the dispersibility and machinability of the products, meanwhile the introduction of amino silane increases flame retardant efficiency of the products.

Thirdly, because excessive melamine is added in late stage in the preparation method of the present disclosure, the excessive melamine is not only used for grafting modified ammonium polyphosphate, but also used for reacting with acidic ammonium polyphosphate whose polymerization is incomplete, making it form polyphosphate melamine, eliminate the formation of water-soluble small molecules, and reduce water solubility of the products to a greater extent. The water solubility is less than 0.1 g/100 mL. Meanwhile the excessive melamine and the generated melamine polyphosphate have no effect on the property and flame retardant of the products.

Fourthly, the present disclosure hydrolyzes amino silane with a moderate amount of ammonia, which may accelerate the hydrolysis of amino silane, meanwhile the mixture after hydrolysis may be directed to be sprayed into the reaction equipment, without introducing any impurities. Generated alcohols may be taken out of the reaction equipment by nitrogen at higher temperature.

Fifthly, amino silane after hydrolysis may be aggregating into crosslinked polyphosphate ammonium products to reduce water solubility and improve the property of resistance to hydrolysis.

Sixthly, the present disclosure solves the problems that traditional ammonium polyphosphate is easy to hydroplaning, not resistant to hydrolysis, poor workability and high water solubility, which expands the application scope of ammonium polyphosphate products.

The above description is only a summary of the technical solutions of the present disclosure, in order to have a better understanding of the technical means of the present disclosure and implement according to the contents of the description, and hereinafter better embodiments of the present disclosure are illustrated with a detailed description of the accompanying tables. The specific implementation of the present disclosure is given in detail by the following embodiments and the accompanying tables.

DETAILED DESCRIPTION OF THE EMBODIMENTS

The following will describe the technical solutions of the present disclosure in detail. Apparently, the embodiments described are merely a portion of embodiments of the present disclosure, and not all the embodiments. Based on the embodiments of the present disclosure, all other embodiments derived by one ordinarily skilled in the art without creative efforts all belong to the scope of the present disclosure.

Example 1

(1) Hydrolyzing Amino Silane 960 g of γ-aminopropyl triethoxysilane was put into 2 L reaction equipment, under the nitrogen protection and stirring, 315 g of ammonia water solution with a concentration of 25% was slowly added in droplet at room temperature. After the dropping was finished in 40 minutes, reaction temperature of the reaction equipment was set at 65~70° C. for 3 h; then set aside.

(2) Synthesizing the Modified Ammonium Polyphosphate

12 Kg of phosphorus pentoxide, 10.94 Kg of diammonium hydrogen phosphate and 50 g of melamine were weighted and then added into 50 L kneader. The revolving speed was adjusted to 30 r/min, the nitrogen flow was set at 0.5 $m^3$/h, and the mixture was heated to 80~82° C. Then the revolving speed was raised to 50 r/min, and the nitrogen flow was raised to 1 $m^3$/h. The preparation liquid in (1) was sprayed from bottom nozzle of the cover of the kneader evenly and slowly, the speed was controlled to finish spraying in 30 minutes, then the reaction temperature of the reaction equipment was maintained between 95° C. and 100° C. After 0.5 h, ammonia gas was started switching to introduce, and the ammonia flow was set at 3 $m^3$/h. The temperature was warmed up to 275~278° C., at this time, the ammonia flow was reduced to 0.5 $m^3$/h and the temperature was still raising. When the temperature was lower than 280° C., 400 g of melamine was added through the inlet. The oil temperature was set at 268° C. and maintained for 3.5 h. Then the temperature was cooled below 80° C., and the graft modified ammonium polyphosphate product 1 was discharged and obtained.

The obtained graft modified ammonium polyphosphate product was smashed with a pneumatic cracker. After tested, the physicochemical property of the products is as below: the double grafting modified ammonium polyphosphate products 1 with 0.1% of moisture, 93% of whiteness, particle size $D_{50}$=9.64 μm, $D_{98}$=23.69 μm, water solubility less than 0.08 g/100 mL, 30.5% of phosphorus content, 0.35% of silicon content and initial decomposition temperature ≥265° C.

Example 2

(1) Hydrolyzing Amino Silane 9.6 Kg of γ-aminopropyl triethoxysilane was put into 20 L reaction equipment, under the nitrogen protection and stirring, 3.15 Kg of ammonia water solution with a concentration of 25% was slowly added in droplet at room temperature. After the dropping was finished in 1 h, reaction temperature of the reaction equipment was set at 65~70° C. for 4 h; set aside.

(2) Synthesizing the Modified Ammonium Polyphosphate

120 Kg of phosphorus pentoxide, 109.4 Kg of diammonium hydrogen phosphate and 500 g of melamine were weighted and then added into 500 L of the kneader. The revolving speed was adjusted to 30 r/min, the nitrogen flow was set at 5 $m^3$/h, and the mixture was heated to 80~82° C. Then the revolving speeding was raised to 50 r/min, and the nitrogen flow was raised to 10 $m^3$/h. The preparation liquid in (1) was sprayed from bottom nozzle of the cover of the kneader evenly and slowly, the speed was controlled to finish the spraying in 1 h, then the reaction temperature of the reaction equipment was maintained between 95° C. and 100° C. After 1 h, ammonia gas was started switching to introduce, and the ammonia flow was set at 10 $m^3$/h. The temperature was warmed up to 275~278° C., at this time, the ammonia flow was reduced to 5 $m^3$/h and the temperature was still raising. If the temperature was up to 320° C., nitrogen was switched to introduce to control the temperature, when the temperature was lower than 300° C., again ammonia gas was switched to introduce, the ammonia flow was still maintained at 5 $m^3$/h.

When the temperature was lower than 280° C., 400 g of melamine was added through the inlet. The oil temperature was set at 270° C., maintained for 4 h. Then the temperature was cooled below 80° C., and the product was discharged.

The above product was smashed with the pneumatic cracker. The test result is as below: the double grafting modified ammonium polyphosphate product 2 with 0.1% of moisture, 94% of whiteness, particle size $D_{50}$=9.89 μm, $D_{98}$=24.76 μm, water with water solubility less than 0.05 g/100 mL, 30.4% of phosphorus content, 0.349% of silicon content and initial decomposition temperature ≥268° C.

Example 3

(1) Hydrolyzing Amino Silane 9.7 Kg of γ-ammonia propyl trimethoxysilane was put into 20 L reaction equipment, under the nitrogen protection and stirring, 3.94 Kg of ammonia water solution with a concentration of 25% was slowly added in droplet at room temperature. After the dropping was finished in 1 h, reaction temperature of the reaction equipment was set at 65~70° C. for 4 h; then set aside.

(2) Synthesizing the Modified Ammonium Polyphosphate

120 Kg of phosphorus pentoxide, 109.4 Kg of diammonium hydrogen phosphate and 450 g of melamine were weighted and then added into 500 L kneader. The revolving speed was adjusted to 30 r/min, the nitrogen flow was set at 5 m³/h, and the mixture was heated to 80~82° C. Then the revolving speed was raised to 50 r/min, and the nitrogen flow was raised to 10 m³/h. The preparation liquid in (1) was sprayed from bottom nozzle of the cover of the kneader evenly and slowly, the speed was controlled to finish spraying in 1 h, then the reaction temperature of the reaction equipment was maintained between 95° C. and 100° C. After 1 h, ammonia gas was started switching to introduce, and the ammonia flow was set at 10 m³/h. The temperature was warmed up to 275~278° C., at this time, the ammonia flow was reduced to 5 m³/h and the temperature was still raising. If the temperature was up to 320° C., nitrogen was switched to introduce to control the temperature, when the temperature was lower than 300° C., again ammonia gas was switched to introduce, the ammonia flow was still maintained at 5 m³/h. When the temperature was lower than 280° C., 4.5 Kg of melamine was added through the inlet. The oil temperature was set at 270° C. and maintained for 4 h. Then the temperature was cooled below 80° C., and the product was discharged.

The product was smashed with the pneumatic cracker to obtain the double grafting modified ammonium polyphosphate product 3 with 0.1% of moisture, 92% of whiteness, particle size $D_{50}$=9.86 μm, $D_{98}$=24.84 μm, water with water solubility less than 0.04 g/100 mL, 30.3% of phosphorus content, 0.435% of silicon content and initial decomposition temperature ≥268° C.

Example 4

(1) Hydrolyzing Amino Silane 12.0 Kg of anilmomethyl triethoxy silane was put into 20 L reaction equipment, under the nitrogen protection and stirring, 3.25 Kg of ammonia water solution was slowly added in droplet at room temperature. After the dropping was finished in 1 h, reaction temperature of the reaction equipment was set at 65~70° C. for 4 h; then set aside.

(2) Synthesizing the Modified Ammonium Polyphosphate

120 Kg of phosphorus pentoxide, 109.4 Kg of diammonium hydrogen phosphate and 450 g of melamine were weighted and then added into 500 L kneader. The revolving speed was adjusted to 30 r/min, the nitrogen flow was set at 5 m³/h, and the mixture was heated to 80~82° C. Then the revolving speed was raised to 50 r/min, and the nitrogen flow was raised to 10 m³/h. The preparation liquid in (1) was sprayed from bottom nozzle of the cover of the kneader evenly and slowly, the speed was controlled to finish spraying in 1 h, then the reaction temperature of the reaction equipment was maintained between 95° C. and 100° C. After 1 h, ammonia gas was started switching to introduce, and the ammonia flow was set at 10 m³/h. The temperature was warmed up to 275~278° C., at this time, the ammonia flow was reduced to 5 m³/h and the temperature was still raising. If the temperature was up to 320° C., nitrogen was switched to introduce to control the temperature, when the temperature was lower than 300° C., again ammonia gas was switched to introduce, the ammonia flow was still maintained at 5 m³/h. When the temperature was lower than 280° C., 4.5 Kg of melamine was added through the inlet. The oil temperature was set at 270° C. and maintained for 4 h. Then the temperature was cooled below 80° C., and the product was discharged.

The product was smashed with the pneumatic cracker to obtain the double grafting modified ammonium polyphosphate product 4 with 0.1% of moisture, 94% of whiteness, particle size $D_{50}$=9.96 μm, $D_{98}$=24.97 μm, water with water solubility less than 0.03 g/100 mL, 30.6% of phosphorus content, 0.359% of silicon content and initial decomposition temperature ≥268° C.

In the described examples 1~4, the products are tested for the physicochemical property and the instruments used are:

Residual moisture: tested by Swiss Mettler-Toledo MJ33 rapid moisture meter;

Thermogravimetric test: tested by German Netzsch TG 209 F3 thermogravimetric analyzer;

Whiteness test: tested by Shanghai Yuefeng SBDY-1 whiteness meter;

Particle size test: tested by British Malvern MS2000 laser granulometer;

Phosphorus content test: tested by Tian Rui instrument EDX1800BS environmental protection instrument;

Silicon content test: tested by SGS.

In other embodiments, the modified ammonium polyphosphate products can be prepared by the amino silane selected from any of the following materials: γ-aminopropyltriethoxysilane, γ-aminopropyltrimethoxysilane, N-β (aminoethyl)-γ-aminopropyltrimethoxysilane, N-β (aminoethyl)-γ-aminopropyl methyl dimethoxysilane, N-β (aminoethyl)-γ-aminopropyltriethoxysilane, N-β (aminoethyl)-γ-aminopropyl-methyl-diethoxysilane, Anilinomethyltriethoxysilane, Anilino methyl trimethoxysilane, γ-amino ethylaminopropyltrimethoxysilane, polyamino-alkyl trialkyl silane.

Example 5

In the example, the obtained graft modified ammonium polyphosphate of examples 1~4 is applied in the modified PP flame retardant material. The material formula is shown in Table 1.

Table 1 the Material Formula Table in Example 5

TABLE 1

| Material | Formula 1 | Formula 2 | Formula 3 | Formula 4 | Formula 5 |
|---|---|---|---|---|---|
| Homo PP (MI = 12) | 687 g | 687 g | 687 g | 687 g | 687 g |
| Internal lubricant EBS | 3 g | 3 g | 3 g | 3 g | 3 g |

TABLE 1-continued

| Material | Formula 1 | Formula 2 | Formula 3 | Formula 4 | Formula 5 |
|---|---|---|---|---|---|
| External lubricant PE wax | 3 g | 3 g | 3 g | 3 g | 3 g |
| Antioxygen B215 | 2 g | 2 g | 2 g | 2 g | 2 g |
| Coupling agent NT201 | 3 g | 3 g | 3 g | 3 g | 3 g |
| Anti dripping agent TF1645 | 2 g | 2 g | 2 g | 3 g | 3 g |
| Charring agent with water insoluble and high temperature resistance | 60 g | 60 g | 60 g | 60 g | 60 g |
| Example 1 | 240 g | — | — | — | — |
| Example 2 | — | 240 g | — | — | — |
| Example 3 | — | — | 240 g | — | — |
| Example 4 | — | — | — | 240 g | — |
| Control (traditional type II APP) | — | — | — | — | 240 g |

After mixing the components in the formula according to the amount of the formula, the mixture is put into the twin-screw extruder, and fiber anterior shear block is added: 45°/5/32 five, 30°/7/48 two, 45°/5/32 L one.

The temperature of main engine is set at: 160° C., 180° C., 190° C., 190° C., 200° C., 200° C., 190° C., 180° C., and revolving speed of the main engine is 240~360 rpm.

The obtained flame retardant materials are tested for properties, and the test results are shown in Table 2.

Table 2 Table of the Properties Test Results

TABLE 2

| Properties | Testing method | Unit | Formula 1 | Formula 2 | Formula 3 | Formula 4 | Formula 5 |
|---|---|---|---|---|---|---|---|
| Density | ASTM D-792 | g/cm$^3$ | 1.06 | 1.06 | 1.06 | 1.07 | 1.06 |
| Melt index (230° C./2.16 kg) | ASTM D-955 | g/10 min | 10.1 | 10.2 | 10.3 | 10.2 | 6.9 |
| Heat distortion temperature (0.45 MPa) | ASTM D-648 | ° C. | 128 | 128 | 128 | 129 | 128 |
| Tensile strength | ASTM D-638 | MPa | 29 | 30 | 29 | 30 | 27 |
| Elongation at break | ASTM D-638 | % | 53 | 54 | 54 | 55 | 46 |
| Bending strength | ASTM D-790 | MPa | 40 | 41 | 41 | 42 | 41 |
| Bending modulus | ASTM D-790 | MPa | 2590 | 2592 | 2593 | 2600 | 2595 |
| Izod notched impact strength | ASTM D-256 | J/m | 26 | 26 | 25 | 26 | 26 |
| Flame retardant property | UL 94 | 1.5 mm | V-0 | V-0 | V-0 | V-0 | V-0 |
|  |  | 3.0 mm | V-0 | V-0 | V-0 | V-0 | V-0 |
|  | GWIT | 3.0 mm | 750° C. | 750° C. | 750° C. | 750° C. | 750° C. |
|  | GWFI | 3.0 mm | 960° C. | 960° C. | 960° C. | 960° C. | 960° C. |
| 70° C. × 168 h | UL746C | 1.5 mm | V-0 | V-0 | V-0 | V-0 | NG |
| Flame retardant property after boilling experiment |  | 3.0 mm | V-0 | V-0 | V-0 | V-0 | NG |
| Humidity 85/Temperature 85° C. test | Last for 168 h | — | No precipitation | No precipitation | No precipitation | No precipitation | precipitation after 24 h |

As seen in Table 2, in the application of PP, graft modified ammonium polyphosphate of examples 1~4 may pass the 70° C.×168 h boiling test and humidity 85/temperature 85° C. test better, meanwhile the control group can't pass the 70° C.×168 h boiling test and humidity 85/temperature 85° C. test.

In examples 1~4, by grafting ammonium polyphosphate with two kinds of amino grafting in stages, excessive melamine reacts with residual active groups including incompletely grafted ammonium polyphosphate and acidic or short chain ammonium polyphosphate products, so as to eliminate the generation of water-soluble small molecules Ammonium polyphosphate of examples 1~4 has remarkable improvement in water resistance and can pass flame retardant application test verification. Under the same additive quantity, the present disclosure has no effect on the flame retardant property of modified PP.

By means of upgrading ammonium polyphosphate products, the application of ammonium polyphosphate products in high pressure pot covers and electrical components for long-term contact with water vapor is widened. Due to the absence of low molecules, there are some improvements in large parts, and the air streaks are obviously reduced or disappeared, which makes it possible for the future ammonium polyphosphate system to completely replace bromine antimony.

Based on the above, the present disclosure grafts ammonium polyphosphate with two kinds of amino grafting in stages, which makes grafting more thoroughly, and greatly improves the hydroplaning of ammonium polyphosphate itself. The modified ammonium polyphosphate products after grafted basically have no hydroplaning when meets water.

The above method relates to introducing the structure of amino silane, using the amino group in amino silane to participate in ammonium polyphosphate synthesis reaction to produce ammonium polyphosphate products containing silane, which may improve the dispersibility and workability of the products. Meanwhile the introduction of amino silane increases flame retarded efficiency of the products.

Moreover, because of addition of excessive melamine in late stage, the excessive melamine is not only used for graft modified ammonium polyphosphate, but also used for reacting with acidic ammonium polyphosphate whose polymerization is incomplete, making it form polyphosphate melamine, eliminate the formation of water-soluble small molecules, and reduce water solubility of the products to a greater extent. The water solubility is less than 0.1 g/100 mL. Meanwhile the excessive melamine and the generated melamine polyphosphate have no effect on the property and flame retardant of the products.

The above method hydrolyzes amino silane with a moderate amount of ammonia, which may accelerate the hydrolysis of amino silane, meanwhile the mixture after hydrolysis may be directed to be sprayed into the reaction equipment, without introducing any impurities, Generated alcohols may be taken out of the reaction equipment by nitrogen at higher temperature Amino silane after hydrolysis may be aggregating into crosslinked ammonium polyphosphate products to reduce water solubility and improve the property of resistance to hydrolysis. The present disclosure solves the problems that traditional ammonium polyphosphate is easy to hydroplaning, not resistant to hydrolysis, poor workability and high water solubility, which expands the application scope of ammonium polyphosphate products.

For the description in the embodiments, the present disclosure may be implemented or used by a person skilled in the art. Various modifications to these embodiments will be obvious for a person skilled in the art, the general principles defined herein may be implemented in other embodiments without departing from the spirit or scope of the present disclosure. Therefore, the present disclosure will not be limited to such embodiments as shown herein, but will accord with the widest scope consisting with the principles and novel features disclosed herein.

What is claimed is:

1. A method for preparation of graft modified ammonium polyphosphate with ultra-low hydroplaning and resistance to hydrolysis, wherein firstly amino silane is hydrolyzed under the condition of ammonia water, and hydrolyzed mixture is added into a reaction equipment which has been put into phosphorus pentoxide, diammonium hydrogen phosphate and melamine for the reaction, comprising the steps of:
   (1) putting amino silane into the reaction equipment, under nitrogen protecting and stirring, adding ammonia water solution in droplet at room temperature, after finishing dropping, controlling reaction temperature of the reaction equipment between 25° C. and 100° C. and reacting for 1~10 h to form a preparation liquid;
   (2) adding phosphorus pentoxide, diammonium hydrogen phosphate and melamine into the reaction equipment, adjusting revolving speed of the reaction equipment, protecting with nitrogen, heating to 60~150° C., then speeding up the revolving speed, increasing nitrogen flow, spraying preparation liquid obtained from (1) at upper portion of the reaction equipment evenly and slowly, after finishing the spraying, maintaining the reaction temperature of the reaction equipment between 60° C. and 150° C., after 0.1~6 h, starting switching nitrogen to introduce ammonia gas, raising the reaction temperature of the reaction equipment to 250~320° C., if the temperature is higher than 320° C., switching ammonia gas to introduce nitrogen, when the temperature is lower than 300° C., again switching nitrogen to introduce ammonia gas, at this time ammonia flow is less than the ammonia flow at the beginning;
   (3) when the temperature of the reaction equipment is lower than 280° C., adding melamine through a inlet, and setting oil temperature of the reaction equipment at 220~280° C., maintaining the temperature for 1~6 h, lowering the temperature, discharging and obtaining graft modified ammonium polyphosphate;
   wherein, concentration of the ammonia water solution in (1) is 25%, the ratio of mole of water in the ammonia water solution and alkoxy in amino silane is 1~1.5:1, and the mass ratio of amino silane and phosphorus pentoxide in (2) is 0.01~0.15;

the ratio of mole of phosphorus pentoxide and diammonium phosphate in (2) is 1~1.5:1, the mass ratio of melamine and phosphorus pentoxide is 0.001~0.025;
the mass ratio of melamine in (3) and phosphorus pentoxide in (2) is 0.01~0.1.

2. The method for preparation of graft modified ammonium polyphosphate with ultra-low hydroplaning and resistance to hydrolysis according to claim 1, comprising the steps of:
   (1) putting amino silane into the reaction equipment, under nitrogen protecting and stirring, adding ammonia water solution in droplet at room temperature, after finishing the dropping, controlling reaction temperature of the reaction equipment between 40° C. and 80° C. and reacting for 1~6 h;
   (2) adding phosphorus pentoxide, diammonium hydrogen phosphate and melamine into the reaction equipment, adjusting the revolving speed of the reaction equipment to 10~40 r/min, under nitrogen protection, setting the nitrogen flow at 0.1~6 m³/h, heating to 70~120° C., then speeding up the revolving speed to 40~60 r/min, and increasing the nitrogen flow to 0.3~15 m³/h, spraying preparation liquid obtained from (1) at upper portion of the reaction equipment evenly and slowly, after finishing the spraying, maintaining the reaction temperature of the reaction equipment between 70° C. and 120° C., after 0.5~3 h, starting switching nitrogen to add ammonia gas, setting the ammonia flow at 1~15 m³/h, raising the reaction temperature of the reaction equipment to 250~320° C., if the temperature is higher than 320° C., switching ammonia gas to add nitrogen, when the temperature is lower than 300° C., again switching nitrogen to add ammonia gas, setting the ammonia gas flow at 0.1~6 m³/h, at this time the ammonia flow is less than the ammonia flow at the beginning;
   (3) when the temperature of the reaction equipment is lower than 280° C., putting melamine through the inlet, and setting the oil temperature of the reaction equipment at 240~270° C., maintaining the temperature for 2~5 h, lowering the temperature to 25~180° C., discharging and obtaining ammonium polyphosphate with graft modification;
   wherein, the ratio of mole of water in the ammonia water solution in (1) and alkoxy in amino silane is 1~1.1:1, the mass ratio of amino silane and phosphorus pentoxide in (2) is 0.02~0.1;
   the ratio of mole of phosphorus pentoxide and diammonium phosphate in (4) is 1~1.08:1, the mass ratio of melamine and phosphorus pentoxide is 0.003~0.015;
   the mass ratio of melamine in (5) and phosphorus pentoxide in (2) is 0.03~0.06.

3. The method for preparation of graft modified ammonium polyphosphate with ultra-low hydroplaning and resistance to hydrolysis according to claim 2, wherein amino silane includes one or more of the followings: γ-aminopropyltriethoxysilane, γ-aminopropyltrimethoxysilane, N-β (aminoethyl)-γ-aminopropyltrimethoxysilane, N-β (aminoethyl)-γ-aminopropyl-methyl-dimethoxysilane, N-β (aminoethyl)-γ-aminopropyltriethoxysilane, N-β (aminoethyl)-γ-aminopropyl-methyl-diethoxysilane, anilinomethyltriethoxysilane, anilinomethyl trimethoxysilane, γ-aminoethylaminopropyltrimethoxysilane, polyamino-alkyltrialkylsilane.

4. An application of graft modified ammonium polyphosphate, which is prepared by the method described in claim 1, wherein, graft modified ammonium polyphosphate is applied to modified PP flame retardant material, and a formula comprises: 240 g of graft modified ammonium polyphosphate, 687 g of homopolymer of polypropylene, 3 g of internal lubricant ethylene bis stearamide, 3 g of external lubricant polyethylene wax, 2 g of antioxidant, 3 g of coupling agent, 2~3 g of anti dripping agent, and 60 g of high temperature resistant water insoluble charring agent.

5. The application of graft modified ammonium polyphosphate according to claim 4, wherein the components in the formula are mixed into a mixture according to the amount of the formula, the mixture is put into a twin-screw extruder, temperature of main engine is set at: 160° C., 180° C., 190° C., 190° C., 200° C., 200° C., 190° C., 180° C., and revolving speed of the main engine is set at 240~360 rpm.

6. The application of graft modified ammonium polyphosphate according to claim 4, wherein melt index of the homopolymer of polypropylene is 12.

\* \* \* \* \*